United States Patent [19]
Clark

[11] 3,971,097
[45] July 27, 1976

[54] CYLINDRICAL BRUSH WITH STUB SHAFT SUPPORT

[76] Inventor: Gaylord J. Clark, 4679 Paw Paw Lake Road, Coloma, Mich. 49038

[22] Filed: Aug. 21, 1975

[21] Appl. No.: 606,659

Related U.S. Application Data

[63] Continuation-in-part of Ser. No. 510,751, Sept. 30, 1974, Pat. No. 3,921,245.

[52] U.S. Cl.................................. 15/179; 15/21 D; 15/182; 29/123
[51] Int. Cl.².......................................... A46B 13/02
[58] Field of Search............ 15/21 D, 21 E, 77, 102, 15/179–183, 198, 200; 29/115, 123

[56] References Cited
UNITED STATES PATENTS

| | | | |
|---|---|---|---|
| 2,818,742 | 1/1958 | Veach................ | 29/123 X |
| 2,924,838 | 2/1960 | Jones et al............ | 15/182 |
| 3,195,159 | 7/1965 | Enchelmaier et al........... | 15/179 X |
| 3,284,830 | 11/1966 | Kroll................ | 15/179 X |
| 3,418,674 | 12/1968 | Lechene............... | 15/182 |
| 3,574,880 | 4/1971 | Butzen................ | 15/179 |
| 3,879,786 | 4/1975 | Larkin................ | 15/21 D |

Primary Examiner—Edward L. Roberts
Attorney, Agent, or Firm—Woodhams, Blanchard and Flynn

[57] ABSTRACT

A separable stub shaft connection for a rotatable surface treating member, such as a brush, having a tubular hub. The connection includes a stub shaft having a preselected length thereof projecting into one end of the hub. A pair of diametrically opposed but axially spaced bearing areas create a secure engagement between the hub and stub shaft when bolted together. Appropriate clearances are provided to permit the shaft and hub to be angularly tilted through at least a limited extent relative to one another so that the stub shaft and hub can be relatively axially displaced when the hub is to be mounted on or removed from the stub shaft. The other end of the hub is mounted on a further stub shaft connection which permits the other end of the hub to be moved transversely relative to the stub shaft. For this purpose, the other end of the hub has a separable arcuate sector which extends through an angle of approximately 180°.

14 Claims, 10 Drawing Figures

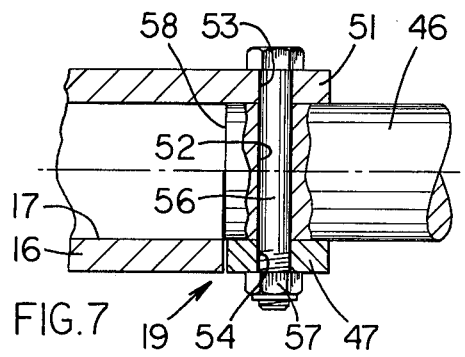
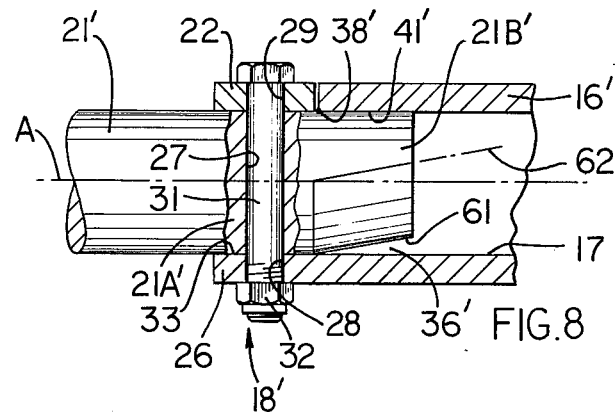
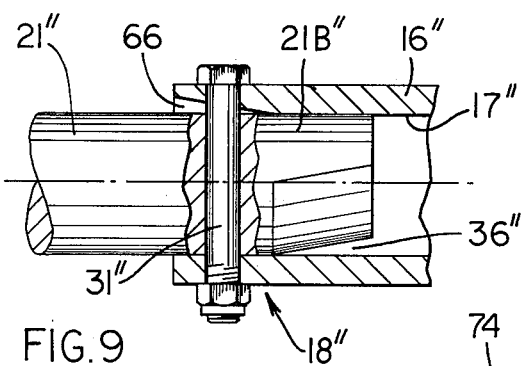
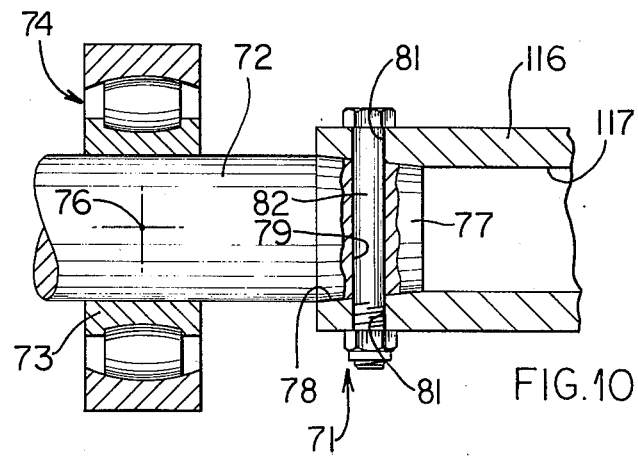

CYLINDRICAL BRUSH WITH STUB SHAFT SUPPORT

CROSS REFERENCE TO RELATED APPLICATION

This application is a continuation-in-part of my copending application Ser. No. 510,751, filed Sept. 30, 1974, now U.S. Pat. No. 3,921,245 issued Nov. 25, 1975.

FIELD OF THE INVENTION

This invention relates to a separable stub shaft connection which is particularly desirable for use with a rotatable surface treatment member, such as a brush or the like, to facilitate replacement or repositioning of the member.

BACKGROUND OF THE INVENTION

In a vehicle washing operation, the rotary brushes undergo substantial wear and thus must be periodically replaced or repositioned. Since the rotary brushes are of substantial length, they are normally supported by bearings located adjacent the opposite axial ends of the brush. For this purpose, the brush normally has stub shafts welded on the ends thereof or has an elongated support shaft extending throughout the length thereof for support on the bearings. This structure makes replacement or repositioning of the brush, such as by turning the brush end for end, extremely difficult and time consuming. Particularly, removal of the brush and replacement or repositioning thereof can normally be accomplished only by first axially pulling out the complete shaft through the bearing assembly. The need to pull the shaft axially through the bearing assembly is extremely difficult and time consuming, and can also cause severe damage to the bearing. Further, such a maintenance or repair operation necessarily results in the washing assembly being shutdown for a substantial period of time.

A further disadvantage associated with structures of this general type is that any damage to the shaft, such as caused by a bad bearing, requires replacement of the complete shaft. This is undesirable, both from the standpoint of the magnitude of maintenance and shutdown time rquired, but also from the standpoint of the cost of the new shaft.

While the above problems are commonly experienced in a vehicle washing operation, substantially similar problems are also encountered in numerous other environments wherein elongated surface treatment members, such as rollers, buffing wheels and the like, are supported by bearings located adjacent the opposite axial ends of the member.

Accordingly, it is an object of the present invention to provide an improved separable stub shaft connection for supporting a rotatable member within a bearing, which stub shaft connection overcomes the above-mentioned disadvantages by greatly simplifying the replacement or repositioning of the rotary member relative to the bearing. The rotary member in a preferred embodiment of the invention, comprises a rotatable surface treatment member such as a brush used in association with a vehicle washing system, whereby the improved stub shaft connection greatly siimplifies both replacement and repositioning of the brush, such as repositioning the brush end for end, thereby providing substantially increased brush life and economy by providing for more uniform wear of the brush.

It is also an object of the present invention to provide an improved stub shaft connection, as aforesaid, which permits the replacement or repositioning of a rotary member, such as a brush, in a minimal amount of time and in a manner which is not damaging to the bearings, and which requires no elaborate tools or equipment.

A further object of the present invention is to provide a stub shaft connection, as aforesaid, which does not require precision machine work so that same can be manufactured in an extremely simple and economical manner, which can be manufactured from relatively inexpensive material, and which can be manufactured in a manner resulting in substantially no wastage of materials. The stub shaft connection of the present invention can also be utilized under adverse conditions where rust and corrosion may occur without adversely affecting or impairing the use of the connection.

Other objects and purposes of the present invention will be apparent to persons acquainted with structures of this general type upon reading the following description and inspecting the accompanying drawings.

BRIEF DESCRIPTION OF THE DRAWINGS

FIG. 7 is an enlarged, fragmentary sectional view of the stub shaft connection associated with the other end of the rotary surface treatment member.

FIG. 8 is a sectional view similar to FIG. 2 and illustrates a modified stub shaft connection.

FIG. 9 is a sectional view similar to FIG. 8 and illustrates another variation of the present invention.

FIG. 10 is a sectional view of a further embodiment.

Figure 1:
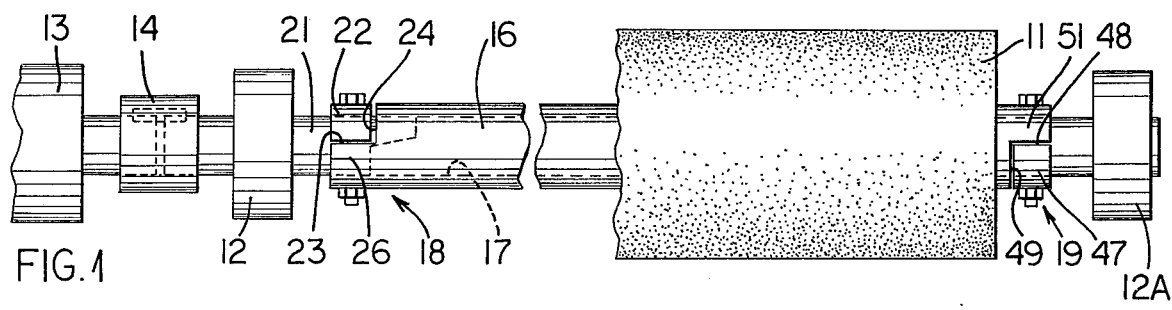
FIG. 1 illustrates a rotary surface treatment system, such as used in association with vehicle washing operation, incorporating therein the improved stub shaft connection of the present invention.

Certain terminology will be used in the following description for convenience in reference only and will not be limiting. For example, the words "upwardly", "downwardly", "leftwardly" and "rightwardly" will refer to directions in the drawings to which reference is made. The words "inwardly" and "outwardly" will refer to directions toward and away from, respectively, the geometric center of the system and designated parts thereof. Said terminology will include the words above specifically mentioned, derivatives thereof and words of similar import.

SUMMARY OF THE INVENTION

The objects and purposes of the present invention, including those set forth above, are met by providing a pair of separable stub shaft connections which, when fixedly secured to the opposite ends of a rotary surface treatment member, such as a brush, enable the surface treatment member to be readily removed and replaced or repositioned relative to the bearing structures. The first stub shaft connection includes a first stub shaft having a bearing portion which is adapted to be rotatably supported within the adjacent bearing structure.

This stub shaft also has a portion which extends into and is fixedly connected to the end of a tubular hub associated with the rotary surface treatment member. The stub shaft and the associated end of the hub engage one another at a pair of rather large bearing areas which are axially spaced and disposed on substantially diametrically opposite sides of the stub shaft. The stub shaft and hub have appropriate clearance spaces therebetween in the regions of the stub shaft spaced from the bearing areas for permitting relative tilting between the stub shaft and hub so that the hub, when in the relatively tilted position, can be axially inserted on, or removed from, the stub shaft. A second stub shaft connection, as associated with the other end of the hub, includes a second stub shaft which is supported on a bearing structure and projects into and is fixedly connected to the other end of the hub. The other end of the hub has a separable arcuate section which partially surrounds the portion of the second stub shaft which projects into the hub, so that removal of this separable section permits the other end of the hub to be transversely displaced relative to the second stub shaft. The transverse movement of the hub, together with the permissible angular tilting permitted by the first stub shaft connection, permits the hub to be axially inserted on or removed from the first stub shaft.

DETAILED DESCRIPTION

FIG. 1 illustrates therein a surface treatment system 10 employing an elongated rotatable surface treatment member 11. In the illustrated embodiment, the system 10 relates to a brushing system of the type commonly utilized in a washing operation for vehicles. The rotary surface treatment member 11 is supported for rotation about a substantially horizontal axis by conventional antifriction bearing assemblies 12 and 12A disposed adjacent the opposite ends thereof. The member 11 is rotatably driven by a conventional drive 13, such as an electric motor, which drive is coupled to one end of the surface treatment member by a conventional coupling 14.

As illustrated in FIG. 1, the surface treatment member 11 is a preferred embodiment of the invention comprises a brush which is of substantially conventional construction in that it includes an elongated tubular support shaft 16 extending throughout the length thereof, which shaft has a bore 17 extending therethrough. The brush 11 has a plurality of brush bristles mounted on and projecting outwardly from the shaft 16, which bristles may be anchored at their radially inner ends to the shaft 16 in any one of numerous conventional ways. One such procedure is illustrated in my U.S. Pat. No. 3,439,373.

The treatment member 11 is provided with separable stub shaft connections 18 and 19 located adjacent the opposite ends thereof, which connections coact with the bearings 12 and 12A to provide for rotatable support of the member 11. These stub shaft connections 18 and 19 additionally permit one end of the treatment member 11 to be moved transversely relative to the rotational axis A defined by the bearings to position the treatment member in a tilted relationship relative to this axis, whereby the treatment member in a tilted relationship relative to this axis, whereby the treatment member can be readily removed and/or replaced relative to the stub shaft connections. This movement will be explained hereinafter.

Considering first the stub shaft connection 18, and referring specifically to FIGS. 1–6, same includes a cylindrical stub shaft 21 which is supported in the bearing 12 and projects therebeyond so that one end of the stub shaft 21 is connected to the coupling 14. The other end of the stub shaft 21 projects axially into the bore 17 formed in the adjacent end of the tube 16. The cooperating portions of stub shaft 21 and tube 16 have appropriate clearance spaces provided therebetween to permit relative tilting between the tube 16 and the stub shaft 21. To permit the above-mentioned tilting, the tube 16 has an arcuate sector 22 cut from the end thereof. The sector 22 is formed by a longitudinal slot 23 which extends completely across the diameter of the tube, which slot may be cut into the end of a tube by a conventional saw. The slot or cut 23 is disposed on a substantially radially extending plane which passes through the axis of the tube. The tube 16 has a further cut or slot 24 formed therein, also by a conventional saw or similar device, which slot 24 is disposed within a radial plane which is substantially perpendicular to the axis of the tube 16. The slot 24 is aligned with the inner or blind end of the slot 23 and extends to the diametrical plane defined by the slot 23. This results in the formation of the arcuate sector 22, which sector extends through an angle which closely approximates 180° but is generally slightly less than this angle due to the width of the slot formed by the cutting operation.

The formation of the removable arcuate sector 22 also results in the formation of a corresponding arcuate sector 26. This sector 26 is substantially identical to the sector 22 in that it extends through an angle of approximately 180°, except that the sector 26 is fixedly, here integrally, connected to the tube 16.

The stub shaft 21 includes a portion 21A which has an external diameter substantially equal to the diameter of the bore 17. This shaft portion 21A extends into the tube 16 through an axial distance substantially equal to the width of the arcuate sectors 22 and 26, whereby the shaft portion 21A is clampingly engaged between the sectors 22 and 26. For this purpose, the shaft portion 21A has an opening 27 extending diametrically therethrough, which opening 27 is alignable with further openings 28 and 29 as formed in the sectors 26 and 22, respectively. The arcuate sectors 22 and 26 and the stub shaft portion 21A are fixedly interconnected by means of a suitable fastening device, such as a bolt 31, which bolt extends through the aligned openings 27–29 and is secured in place by a threaded nut 32. This bolted connection results in the formation of a clamping area 33 between the stub shaft 21 and the tube 16, which clamping area extends circumferentially around the stub shaft through an angle of approximately 180° and through an axial length which is approximately equal to the width of the arcuate sector 22.

The stub shaft 21 has a further shaft portion 21B formed on the free end thereof, which shaft portion 21B constitutes an extension of the shaft portion 21A and is received within the bore 17. However, a part of the shaft portion 21B is removed so as to result in the formation of a clearance space 36 between the stub shaft and the surrounding tube 16. The clearance space 36 is, in the embodiment illustrated in FIGS. 2 and 6, defined by a rear surface 37 which extends transverse to the axis A and passes through the point or corner 38 at the end of the tube 16. The surface 37 cannot be positioned inwardly (rightwardly in FIG. 6) from the transverse plane passing through the corner 38 and, in a practical embodiment of the invention, is normally positioned slightly outwardly (leftwardly in FIG. 6) from this transverse plane. The purpose for this location will be explained hereinafter.

Figure 6:
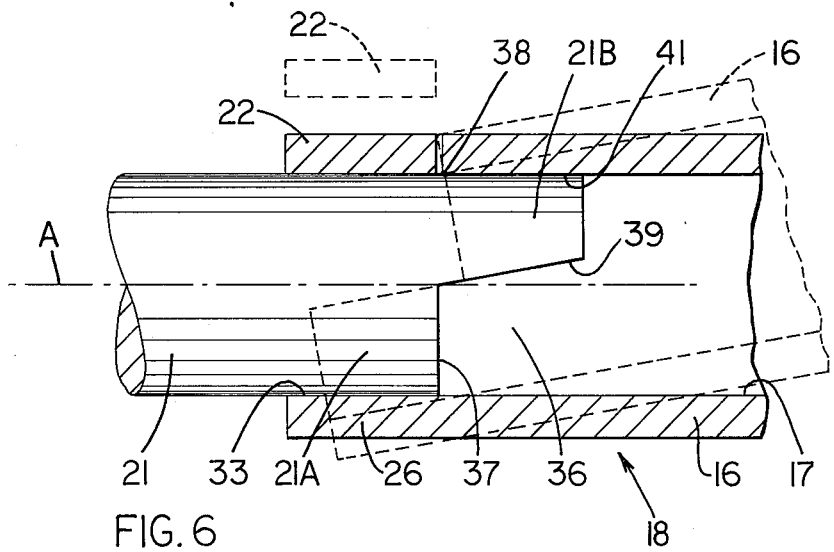
FIG. 6 is a view similar to FIG. 2 on an enlarged scale.

The clearance space 36 is additionally defined by a further surface 39 which, as shown in FIG. 6, extends between the free end of the shaft portion 21B and the rear surface 37. The surface 39 intersects the rear surface 37 in the immediate vicinity of the axis A and then slopes upwardly as it projects toward the free end of the shaft 21B so that the shaft portion 21B extends through an angle of approximately 180° in the vicinity of the rear surface 37, but extends through a progressively decreasing angular extent as the sloped surface 39 projects toward the free end of the shaft. The shaft portion 21B thus extends through an angle of less than 180° at the free end thereof.

Since the shaft portion 21B is originally of the same diameter as the shaft portion 21A, there is thus formed a clamping area 41 between the shaft portion 21B and the tube 16, which clamping area 41 extends through an arcuate extent which approaches, but is slightly less than, 180°. This clamping area 41 is disposed diametrically opposite the clamping area 33. In addition, the clamping areas 33 and 41 are axially spaced from one another since the area 33 is disposed leftwardly of the transverse plane through the corner 38, whereas the area 41 is disposed rightwardly of this transverse plane. These diametrically opposite but axially spaced clamping areas 33 and 41 result in a secure clamping relationship between the stub shaft 21 and the tube 16 when they are bolted together, since the stub shaft portions 21A and 21B are of an external diameter substantially equal to the internal diameter of the tube 16.

Figures 2, 3:
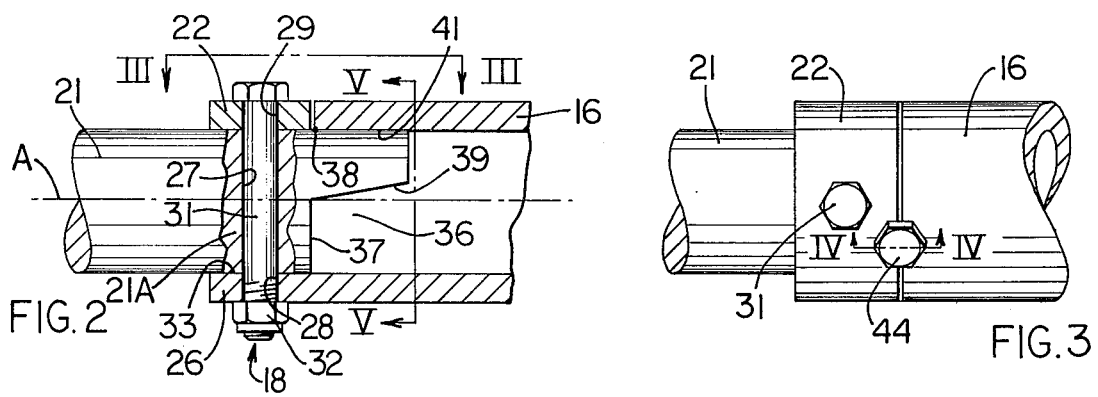
FIG. 2 is an enlarged, fragmentary sectional view illustrating the stub shaft connection associated with one end of a rotary surface treatment member.
FIG. 3 is a view taken along the line III—III in FIG. 2.
Figure 4:
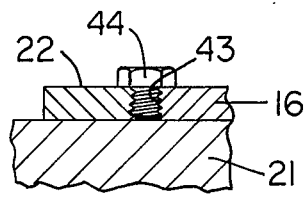
FIG. 4 is a fragmentary sectional view taken along the line IV—IV in FIG. 3.
Figure 5:
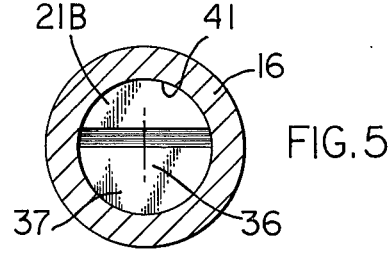
FIG. 5 is a sectional view taken along the line V—V in FIG. 2.

To additionally facilitate the transmission of torque from the drive 13 through the stub shaft 21 to the tube 16, the separable arcuate sector 22 and the tube 16 can be suitably keyed together. One such structure is illustrated in FIGS. 3 and 4, and for this purpose the arcuate sector 22 and tube 16 are provided with a threaded opening 43 therein directly in the vicinity of the radial slot 24 so that the opening 43 is formed partially in the sector 22 and partially in the tube 16. A suitable threaded screw 44 is then engaged within the opening 43 to thereby form a torque transmitting key between the sector 22 and the tube 16. As shown in FIG. 4, the screw 44 extends only into and substantially through the wall of the sector 22 and the tube 16, and does not project into the stub shaft 21.

The stub shaft connection 18, by having the diametrically opposed clamping areas 33 and 41 coacting between the stub shaft and the tube, thus provides a connection which is able to transmit the desired torque from the stub shaft 21 to the tube 16. This is particularly significant since the stub shaft connection 18 functions as the driving connection inasmuch as it is disposed between the drive 13 and the tube 16. These diametrically opposed clamping areas 33 and 41 thus significantly increase the strength of the stub shaft connection due to the frictional clamping engagement created by the areas 33 and 41. The drive torque is thus not transmitted solely through the bolt 27, and thus the stresses on these elements, and particularly the shear stress on the bolt 27, is accordingly substantially minimized.

Considering now the stub shaft connection 19 associated with the other end of the tube 16, and referring specifically to FIg. 7, same includes a stub shaft 46 which is rotationally supported by the bearing structure 12A. The stub shaft 46 is adapted to project into and be connected to the adjacent end of the shaft 16. For this purpose, the shaft 16 is provided with a removable arcuate sector 47 which extends through an angle of appoximately 180°, which sector is similar to and formed in a substantially similar manner to the sector 22. That is, the sector 47 is formed by a longitudinal slot or cut 48 which extends axially of the tube 16 and is contained within a plane which passes through the axis A, which slot 48 connects with a radial slot or cut 49 which extends perpendicular to the axis A. The sector 47 is thus substantially identical to the sector 22 except that it is located at the opposite end of the tube 16 and is angularly displaced from the sector 22 by an angle of 180°. The sector 47, when cut from the end of the shaft, also results in the formation of a further arcuate sector 51 which extends through an angle of approximately 180° and is fixedly, here integrally, connected to the tube 16.

The end of the stub shaft 46 has an external diameter substantially equal to the diameter of the bore 17, and the stub shaft 46 additionally has an opening 52 extending diametrically therethrough, which opening aligns with similar openings 53 and 54 formed in the sectors 51 and 47, respectively. These latter-mentioned openings, when aligned, receive therein a bolt 56 having a nut 57 threaded on the end thereof for permitting the shaft 46 to be clampingly and fixedly connected to and between the sectors 47 and 51.

In the stub shaft connection 19, the stub shaft 46 projects into the shaft 16 through a distance no greater than the axial length of the arcuate sectors 47 and 51, so that the end face 58 of the stub shaft 46 is thus positioned substantially at or spaced slightly outwardly from the transverse plane defined by the slot 49. The stub shaft 46 is thus clampingly engaged to the tube 16 solely due to the clamping area which exists between the shaft 46 and the arcuate sector 51. However, since the stub shaft connection 19 functions solely for supporting the end of the treatment member 11 on the adjacent bearing structure 12A, and does not function as a torque transmitting connection, the stresses imposed on the stub shaft connection 19 are substantially smaller than the stresses imposed on the connection 18, so that substantially less clamping area between the stub shaft and the tube is required.

If desired, the torque transmitting capacity of connection 19 can be increased and/or the loading stresses decreased by providing a torque transmitting key between the arcuate sector 47 and the tube 16. For this purpose, the sector 47 and tube 16 can be directly keyed together by any conventional structure, such as by using a threaded screw similar to the screw 44 associated with the connection 18.

OPERATION

When the surface treatment system 10 is in the assembled condition illustrated in FIG. 1, driving torque is transmitted from the drive 13 through the coupling 14 and through the stub shaft connection 18 to the tube 16 so as to rotate same. Since the stub shaft connection 18 functions as a torque transmitting connection, this torque transmission is greatly facilitated by the connection 18 since the stub shaft 21 includes the portions 21A and 21B which project into the end of the tube 16 and create two substantially large clamping areas 33 and 41, which, while being axially spaced, are nevertheless diametrically opposed and create a secure connection between the shaft 21 and the tube 16. While the connection 19 has a secure clamping engagement between the shaft 46 and the tube 16 only through a single area, namely the area between the shaft 46 and the sector 51, nevertheless this is sufficient since the stub shaft connection 19 is provided solely for supporting the member 11 on the bearing structure 12A.

The stub shaft connections 18 and 19 also permit the imposition of a substantial external load on the member 11 without unduly stressing the stub shaft connections. For example, by positioning the system 10 so that the maximum external load is exerted on the upper side of the member 11 as illustrated in FIG. 1, this load is transmitted directly through the sector 21 onto the stub shaft 47 at one end of the member 11, and directly through the tube 16 onto the stub shaft portion 21B at the other end of the member 11.

When it is desired to remove or replace the member 11, this can be accomplished by first removing the bolts 31 and 56 associated with the stub shaft connections 18 and 19, respectively. The rightward end of the tube 16 as associated with the connection 19 can then be moved transversely (upwardly in FIGS. 1 and 7) relative to the axis A, which transverse movement is permitted since the end face 58 of the stub shaft 46 is disposed at or slightly outwardly from the slot 49. This outward transverse movement of the rightward end of the shaft 16 is accommodated by a pivoting of the leftward end of the shaft 16 about the stub shaft 21. This permissible pivoting between the tube 16 and the stub shaft 21 occurs about the corner 38 and is permitted due to the provision of the clearance space 36 associated with the shaft portion 21B and is additionally permitted due to the clearance provided by the removal of the arcuate sector 22. The tube 16 can thus be tilted outwardly into a position substantially as illustrated by dotted lines in FIG. 6, in which position the rightward end of the tube 16 and the surface treatment member 11 is sufficiently clear of the stub shaft 47 to permit the member 11 and tube 16 to be pulled axially (rightwardly in FIG. 6) off of the stub shaft 21. In this manner, the member 11 and its associated tube 16 can be readily removed from the stub shafts 21 and 47 without requiring any removal or repositioning of the stub shafts or the associated bearing structures. In a similar manner, a treatment member can be easily mounted on the stub shafts 21 and 47 by a sequence of steps which is the reverse of the removal operation described above.

Further, since the opposite ends of the tube 16 are each provided with identical removable arcuate sectors associated therewith, the treatment member 11 and its associated tube 16 can also be removed and repositioned end for end, and then remounted on the stub shafts so as to provide for more uniform wear of the treatment member 11 in those usage situations where uneven wear is encountered.

Thus, replacement or repositioning of the surface treatment member, replacement of a bearing, or replacement of a stub shaft, can be carried out efficiently and economically so that the overall system will be shut down for only a minimum amount of time. Further, this replacement or maintenance operation can be accomplished without requiring the use of elaborate tools or equipment.

The stub shaft connections can be manufactured from commercially available tubes and shafts of relatively inexpensive material, and can be fabricated into the desired stub shaft connections without requiring expensive machining or the like.

MODIFICATIONS

FIG. 8 illustrates a modification of the stub shaft connection illustrated in FIGS. 2 and 6. The modified connection 18' of FIG. 8 is identical to the connection 18 of FIGS. 2 and 6 except that the clearance space 36' as associated with the stub shaft portion 21B' is formed by a tapered surface 61 which extends axially of the shaft portion 21B' and circumferentially therearound so as to terminate at lines which closely correspond to the edges of the sloped surface 39 as illustrated in FIG. 2. The presence of this tapered surface 61, which extends through an arcuate extent of about 180°, results in the shaft portion 21B' having the same exterior surface 41' in clamping engagement with the tube 16' as is provided by the shaft portion 21B illustrated in FIGS. 2 and 6. The tapered surface 61 can be formed in any conventional manner, such as by grinding or the like. For example, the tapered surface 61 can be generated about an axis 62 which is inclined relative to the rotational axis A, with the radius of the tapered surface 61 being equal to the radius of the stub shaft 21'. The tapered surface 61 terminates at or slightly outwardly from a transverse radial plane passing through the corner 38'.

The structure of the stub shaft connection 18' illustrated in FIG. 8, and the manner in which it cooperates for permitting relative pivotal movement of the tube, is identical to the description set forth above with respect to FIGS. 2 and 6.

FIG. 9 illustrates therein a modified stub shaft connection 18'' which can be substituted for the stub shaft connections 18 or 18'. The stub shaft connection 18'' is identical to the connection 18 or 18' except that the tube 16'' is not provided with a separable arcuate sector, such as the sector 22. Rather, in this embodiment, the tube 16'' is provided with an enlarged or undercut recess 66 formed in the interior wall thereof, which recess 66 is tapered and projects inwardly from the free end of the tube. The recess 66 extends through an axial length corresponding to the length of the arcuate sector 22, and in addition extends circumferentially of the tube 16'' through an angle of approximately 180°. The recess 66, which is axially spaced from and diametrically opposite the clearance 36'' formed on the stub shaft portion 21B''', thus provides sufficient clearance (equivalent to the clearance provided when the arcuate sector 22 is removed) to permit the required tilting of the tube 16'' relative to the stub shaft 21'' into a position similar to that indicated by dotted lines in FIG. 6.

A still further embodiment of a stub shaft connection 71 is illustrated in FIG. 10, which stub shaft connection can also be substituted for the connections 18, 18' or 18''. The stub shaft connection 71 includes a stub shaft 72 which extends through the inner race 73 of a self-aligning antifriction bearing assembly 74 (which is equivalent to the bearing structure 12 in FIG. 1). This self-aligning bearing assembly 74 permits a limited universal swiveling movement of the stub shaft 72 about the center 76. The end of stub shaft 72 projects into the bore 117 formed in the tube 116 (equivalent to tube 16 in FIG. 1). For this purpose, the stub shaft 72 has a truncated conical portion 77 formed on the free end thereof, which portion is adapted to be snugly received within a conical recess 78 as formed in the adjacent end of the tube 116. The conical recess 78 and the conical portion 77 permit a tight wedge-like engagement to be created between the stub shaft 72 and the tube 116. The stub shaft and the tube are then suitably fixedly connected by a bolt 82 which extends through a diametrical opening 79 formed in the shaft portion 77 and through aligned openings 81 formed through the diametrically opposed portions of the tube 116.

In the modifications of FIGS. 8–10, the stub shaft connection 18', 18'' or 71 is provided adjacent only one end of the tube, and a connection similar to the stub shaft connection 19 is provided at the other end of the tube. Thus, with respect to the embodiments of FIGS. 8 and 9, the surface treatment member and its associated tube can be suitably tilted relative to the stub shaft 21' or 21'' to thereby permit sufficient axial displacement of the surface treatment member to permit removal, repositioning or replacement thereof.

With respect to the embodiment of FIG. 10, one end of the tube 16 is moved transversely relative to the rotational axis, as permitted by the stub shaft connection 19. However, before attempting to transversely displace the one end of the tube 116, the drive coupling (such as 14 in FIG. 1) between the stub shaft 72 and the drive must first be disconnected. Thus, when the other end of the tube is transversely displaced, then the stub shaft connection 71 will permit the tube 116 and the stub shaft 72 to pivot or swivel about the center point 76, as permitted by the self-aligning bearing 74, through a sufficient angle to permit the tube 116 and the associated surface treatment member to clear the stub shaft connection 19. Then, after removal of the bolt 82, the tube 116 can be axially pulled off of the tapered portion 77 of the stub shaft 72 so as to permit removal, repositioning, or replacement of the appropriate surface treating member.

While the above description illustrates the removable sectors 22 and 47 as being separable from both the tube and the stub shafts, it will be appreciated that the sectors 22 and 47 could be fixedly secured to their respective stub shafts if desired, such as by being welded thereto. However, the sector 22 associated with the stub shaft connection 18 must be slightly spaced from the adjacent end of the tube to provide sufficient clearance so as to not interfere with the tilting of the tube relative to the stub shaft.

In addition, the clearance provided between the stub shaft and the tube, such as the clearance 36 or 36' can be provided by forming a recess in the interior wall of the tube, rather than on the stub shaft. However, from a manufacturing standpoint, providing this clearance on the stub shaft is preferred.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In combination, rotary brush means having a sleevelike hub provided adjacent one end thereof and defining therein a bore coaxial of said brush means, a pair of bearing means positioned ajacent the opposite ends of said rotary brush means, and shaft means connected between said rotary brush means and said pair of bearing means for supporting said brush means for rotation about a rotational axis defined by said bearing means, said shaft means including a stub shaft connecting means connected to said hub and coacting with an adjacent one of said bearing means, said connecting means including a stub shaft having a first shaft portion rotatably supported within said one bearing means and a second shaft portion spaced from said first shaft portion and positioned within said bore and fixedly connected to said hub, comprising the improvement wherein said stub shaft connecting means includes first means defining a recess within said hub and extending axially inwardly a first preselected distance from the free end thereof, said recess extending circumferentially of said hub through an angle of at least approximately 180°, said second shaft portion including a first shaft part disposed within said hub and extending axially throughout said first preselected distance, said hub and said first shaft part having a first clamping area therebetween which is spaced diametrically opposite from said recess, said second shaft portion including a second shaft part disposed directly adjacent said first shaft part and defining the free end of said stub shaft, said second shaft part extending inwardly into said hub for a second preselected distance beyond said first preselected distance, and second means associated with said hub and said second shaft part for creating a clearance space therebetween which extends axially of said hub throughout at least said second preselected distance, said clearance space extending circumferentially of said hub through an angle of at least approximately 180°, said clearance space being diametrically opposite but axially spaced from said recess whereby said stub shaft and said hub can be relatively angularly displaced about a pivot axis which is substantially perpendicular to the rotational axis, said second shaft part and said hub having a second clamping area therebetween which is spaced circumferentially from said clearance space, whereby said first and second clamping areas are disposed on diametrically opposite sides of said stub shaft and are axially displaced relative to one another.

2. A combination according to claim 1, wherein said clearance space is formed on said second shaft part so that said second shaft part has a noncircular cross section.

3. A combination according to claim 2, wherein said recess is formed in the inner wall of said hub adjacent the free end thereof and projects outwardly only partway through the wall of said hub, said recess being defined by a surface which is sloped relative to the rotational axis.

4. A combination according to claim 1, wherein said recess extends throughout the radial thickness of the hub and defines a slotlike opening within said hub, and a separable arcuate portion adapted to be positioned within said slotlike opening so as to substantially occupy same, said separable arcuate portion cooperating with said hub so as to define said bore when said separable portion is disposed within said slotlike opening, said first shaft part being positionable within said bore so as to be surrounded by said hub and said separable arcuate portion, and fastener means fixedly interconnecting said hub, said first shaft part and said separable arcuate portion in fixed relationship relative to one another.

5. A combination according to claim 4, including removable key means extending axially between said separable arcuate portion and said hub for providing a torque transmitting connection therebetween, said key means being free of connection to said stub shaft.

6. A combination according to claim 5, wherein said first shaft part is of a cylindrical configuration having an outer diameter substantially equal to the diameter of said bore.

7. A combination according to claim 6, wherein said clearance space is formed on said second shaft part so that said second shaft part is of a noncylindrical configuration, said second shaft part having an arcuate sector extending through an angle of less than 180° and being of a radius substantially equal to the radius of said first shaft part.

8. A combination according to claim 4, wherein said shaft means includes second stub shaft connecting means coacting between the other end of said rotary brush means and said other bearing means, said second stub shaft connecting means permitting disconnection of said rotary brush means and displacement thereof transversely relative to said rotational axis.

9. A combination according to claim 1, wherein said shaft means includes second stub shaft connecting means coacting between the other end of said rotary brush means and said other bearing means, said second stub shaft connecting means permitting disconnection of said rotary brush means and displacement thereof transversely relative to said rotational axis.

10. A combination according to claim 9, wherein said second stub shaft connecting means includes a second stub shaft having a first stub shaft part rotatably supported on said other bearing means and a second stub shaft part projecting into a bore formed in a hub portion associated with the other end of said rotary brush means, said hub portion having opening means extending axially inwardly from the free end thereof through a preselected distance and also extending circumferentially of said hub portion through an angle of approximately 180°, and a removable arcuate part extending through an angle of approximately 180° and adapted to be disposed in said opening means, and a fastening device extending between said hub portion and said arcuate part and coacting with said second stub shaft part for fixedly connecting same together.

11. In combination, rotary surface treatment means having a sleevelike hub provided adjacent one end thereof and defining therein a bore, a bearing means positioned adjacent the end of said rotary surface treatment means, and stub shaft connecting means connected between said hub and said bearing means for supporting said surface treatment means for rotation about a rotational axis defined by said bearing means, said stub shaft connecting means including a stub shaft having a first shaft portion rotatably supported within said bearing means and a second shaft portion spaced from said first shaft portion and positioned within said bore and fixedly connected to said hub, comprising the improvement wherein said stub shaft connecting means includes first means defining a recess within said hub and extending axially inwardly a first preselected distance from the free end thereof, said recess extending circumferentially of said hub through an angle of at least approximately 180°, said second shaft portion including a first shaft part disposed within said hub and extending axially throughout said first preselected distance, said hub and said first shaft part having a first clamping area therebetween which is spaced diametrically opposite from said recess, said second shaft portion including a second shaft part disposed directly adjacent said first shaft part, said second shaft part extending inwardly into said hub for a second preselected distance beyond said first preselected distance, and second means associated with said hub and said second shaft part for creating a clearance space therebetween which extends axially of said hub throughout at least said second preselected distance, said clearance space extending circumferentially of said hub through an angle of at least approximately 180°, said clearance space being diametrically opposite but axially spaced from said recess whereby said stub shaft and said hub can be relatively angularly displaced about a pivot axis which is substantially perpendicular to the rotational axis, said second shaft part and said hub having a second clamping area therebetween which is spaced circumferentially from said clearance space, whereby said first and second clamping areas are disposed on diametrically opposite sides of said stub shaft and are axially displaced relative to one another.

12. A combination according to claim 11, wherein said clearance space is formed on said second shaft part so that said second shaft part has a noncircular cross section.

13. A combination according to claim 12, wherein said recess extends throughout the radial thickness of the hub and defines a slotlike opening within said hub, and a separable arcuate portion adapted to be positioned within said slotlike opening so as to substantially occupy same, said separable arcuate portion cooperating with said hub so as to define said bore when said separable portion is disposed within said slotlike opening, said first shaft part being positionable within said bore so as to be surrounded by said hub and said separable arcuate portion, and fastener means fixedly interconnecting said hub, said first shaft part and said separable arcuate portion in fixed relationship relative to one another.

14. A combination according to claim 11, including second bearing means disposed adjacent the other end of said surface treatment means in alignment with said rotational axis, and second stub shaft connecting means coacting between the other end of said rotary surface treatment means and said second bearing means, said second stub shaft connecting means permitting disconnection of said surface treatment means and displacement thereof transversely relative to said rotational axis.

* * * * *